Dec. 11, 1923.　　　　　L. H. DEBS　　　　　1,477,249
BAKING PAN
Filed May 1, 1922
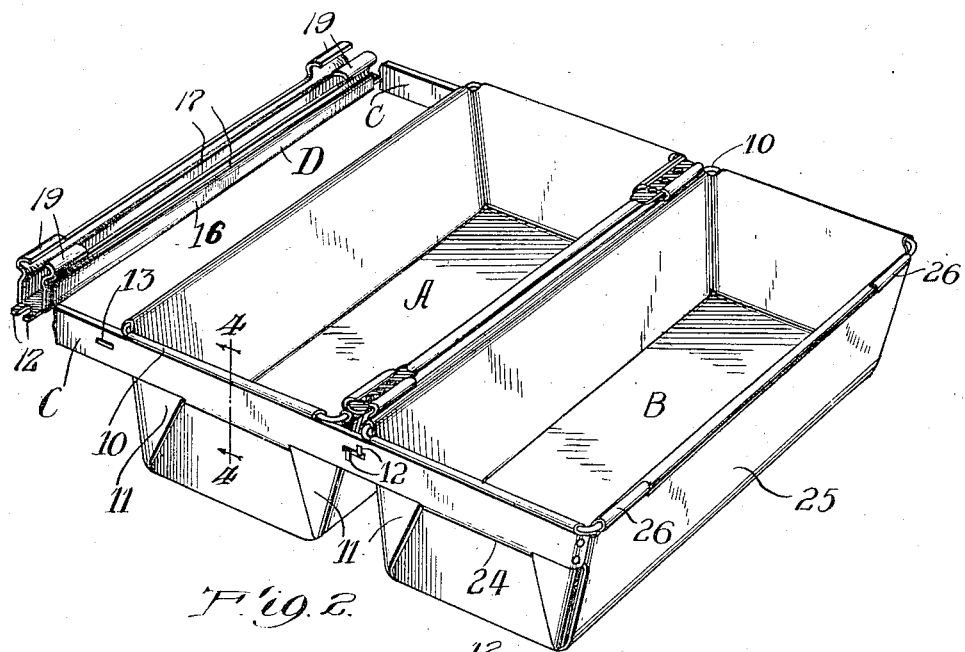
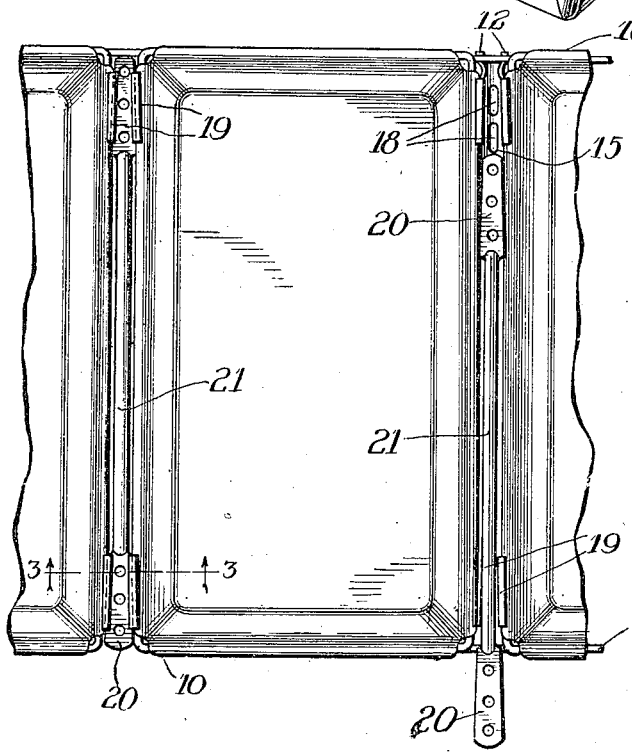
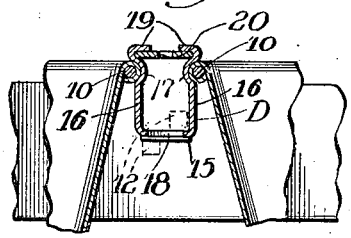
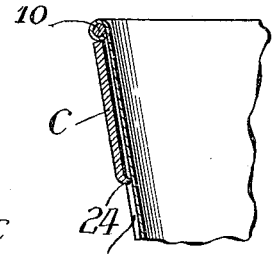
Inventor:
Louis H. Debs, Patented Dec. 11, 1923.

1,477,249

UNITED STATES PATENT OFFICE.

LOUIS H. DEBS, OF CHICAGO, ILLINOIS, ASSIGNOR OF ONE-HALF TO ALBERT COHN, OF CHICAGO, ILLINOIS.

BAKING PAN.

Application filed May 1, 1922. Serial No. 557,556.

*To all whom it may concern:*

Be it known that I, LOUIS H. DEBS, a citizen of the United States, residing at Chicago, in the county of Cook and State of Illinois, have invented certain new and useful Improvements in Baking Pans, of which the following is a specification.

This invention relates to a multiple baking pan, the constituent parts of which are connected by certain novel and improved means.

It is a primary object of my invention to provide for the several pans a connection which will permit of each pan being individually removed whenever desired; and a connection which will be secure and nonobstructive so that the baking pan unit may be handled without liability of its several connecting parts being brought into contact with any surrounding objects. Other purposes and uses of the invention will hereinafter appear from the specification and claims, and from the accompanying drawing wherein is represented a preferred embodiment thereof in the manner following:

Figure 1 is a perspective view of two pans arranged side by side to form part of a unit, the connecting means therebetween being clearly shown, also in detached relation, one of the brace elements;

Fig. 2 is an enlarged view in plan of one pan and of portions of the adjacent pans, one of the connecting means being adjusted to final position and the other in a preliminary position;

Fig. 3 is an enlarged detail in section taken on line 3—3 of Fig. 2; and

Fig. 4 is a similar view taken on line 4—4 of Fig. 1.

The two pans A and B are similar to others that are arranged side by side in a row to constitute a unit for convenience in handling. Each pan may be formed, as is customary, with an outturned wire edge 10, the contour of which is generally circular. Corner folds 11 are disposed upon the outer face of each pan end adding thereto an extra thickness which is not present in the intervening or central portion of each pan end—such a construction being common to pans of this character.

To secure the pans together in unitary relation, I make use of a frame which includes a connecting strap C arranged adjacent each end of the several pans, the upper edge of the strap lying close to the underside of the proximate pan edges. Associated with the pans and straps so formed are brace elements D extending from one strap to the other, one of such braces lying in the space between each of the adjoining pans. Each of these braces is connected with the straps as through the medium of tongues 12 extended from the brace ends to pass through elongated slots 13 in the strap C, the tongues being thereafter bent laterally as shown. This form of connection which permits of slight play, as necessary, is typical of one which may be employed to advantage.

Each of the brace elements is preferably channeled in cross section, as appears best in Fig. 3, having a bottom wall 15 from which upstand parallel side walls 16, each of the latter having portions thereof which are crimped or recessed as at 17 to partially embrace the proximate pan edges 10. These walls preferably have a desirable degree of spring action so as to constitute in effect spring clips for engaging the wire edges of the adjacent pans. To promote free ventilation of air between the pans suitable openings 18 may be formed in the bottom wall, as shown. The clip portions of the side walls 16 are provided with extensions 19 laterally bent toward each other, forming with the crimps 17 a longitudinally tapering guideway. As shown in Figs. 1 and 2, each brace is provided with two such sets of extensions so as to form two guideways each tapered in the same direction. Adapted to be shifted within each of the guideways so formed is a tongue 20 tapered to exert a wedge force therein, as its position is advanced. With double sets of guideways, as shown, it is preferred that multiple tongues be used, a rod 21 extending from one to the other as a connection therebetween. If desired, the tongues may be perforated to facilitate shifting movements thereof with the aid of my appropriate tool. On the lefthand side of Fig. 2 I have illustrated the tongues in locking position within the guideways, the tongues on the righthand side of this figure being removed from engaging position therewith.

The brace element D shown in Fig. 3 is formed with clip portions which may be sprung toward each other whenever the wedge tongues are disengaged. Such a brace lends itself to the formation of the tapered guideways with which the wedge tongues cooperate to spread the side walls of the brace for the exertion of a lateral pressure against the wire edges of the several pans. By removing the wedge tongues any selected pan may be removed from the unit for purposes of repair, substitution or otherwise.

As indicated best in Fig. 4, there are portions 24 inturned from the lower edge of each strap so as to lie between the corner folds 11 adjacent the pan ends for the purpose of closing the entrance to the space therebehind. This is desirable from the standpoint of sanitation as well as for other reasons. At each end of the row of pans constituting the unit, the straps may be connected with a protection plate 25 of any approved character, such a plate being formed by preference with clips 26 adapted to engage the proximate wire edge of the end pan. In this manner a complete enclosure for the several pans is provided.

It is preferred that the braces shall connect shiftably with the straps so as to allow of a slight longitudinal movement as the pans are being assembled in position. Such a connection is provided by means of the tongues and slots heretofore described. It will accordingly be noted that the several pans are adapted for positioning within the frame enclosure, the wire edges on the pan ends resting on the straps while on the sides thereof they are engaged by the spring clips. The action of these clips becomes positive when the wedge locks are inserted, thereby removing all likelihood of accidental displacement of any pan.

I claim:

1. The combination with a plurality of pans arranged side by side in a row, each pan having an outturned edge, of means for connecting the several pans in unitary relation, said means including a strap arranged adjacent to each side of the pan row, elements extending from one strap to the other between the pans, multiple clips carried by each element adapted to engage with certain of the pan edges, and multiple means adapted to maintain the clips in engaging relation therewith, substantially as described.

2. The combination with a plurality of pans arranged side by side, each having an outturned edge, of means for connecting the several pans in unitary relation comprising straps extended along each of the opposite ends of the pans, braces disposed between the several pans to connect with the straps, spring means carried by the braces for engaging with the proximate pan edges, and means for locking said spring means against yielding, substantially as described.

3. The combination with a plurality of pans arranged side by side in a row, each pan having an outturned wire edge, of means for connecting the several pans in unitary relation comprising a strap arranged adjacent each side of the row, brace elements connecting the two straps between the pans and formed to provide spring means for engaging with the proximate wire edges thereof, and a wedge lock adapted to maintain said spring means in a fixed position whereby the pans are positively locked together, substantially as described.

4. The combination with a plurality of baking pans arranged side by side, each pan having an outturned edge, of spring clips arranged intermediately of the pans each adapted to engage yieldingly with the proximate wire edges thereof, means connected with each clip providing a tapered guideway, and means adapted for movement within the guideway to lock the clips against yielding, substantially as described.

5. The combination with a plurality of pans arranged side by side, each having an outturned edge, of means connecting the several pans in unitary relation, said means including oppositely disposed spring clips adapted to engage certain of the pan edges, and means adjustably co-acting with said oppositely disposed clips for holding the same against yielding, substantially as described.

6. The combination with a plurality of pans arranged side by side, each having an outturned edge, of means connecting the several pans in unitary relation including spring clips adapted to engage certain of the pan edges, the said connecting means providing mountings for said clips wherein the latter may shift toward or from the edges with which they are engaged, substantially as described.

LOUIS H. DEBS.

Witness:
EPHRAIM BANNING.